United States Patent
Kato et al.

(10) Patent No.: US 7,057,783 B2
(45) Date of Patent: Jun. 6, 2006

(54) LIGHT DEFLECTOR, METHOD OF MANUFACTURING LIGHT DEFLECTOR AND TORSION OSCILLATING MEMBER

(75) Inventors: Takahisa Kato, Kanagawa (JP); Takayuki Yagi, Kanagawa (JP); Yasuhiro Shimada, Kanagawa (JP); Yukio Furukawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/117,357

(22) Filed: Apr. 29, 2005

(65) Prior Publication Data
US 2005/0185240 A1   Aug. 25, 2005

Related U.S. Application Data

(62) Division of application No. 10/188,809, filed on Jul. 5, 2002, now Pat. No. 6,924,914.

(30) Foreign Application Priority Data

Jul. 11, 2001 (JP) ............................ 2001-211039
Jul. 1, 2002 (JP) ............................ 2002-192210

(51) Int. Cl.
*G02B 26/08* (2006.01)
(52) U.S. Cl. .................. 359/224; 359/213; 359/214; 359/900
(58) Field of Classification Search .................. None
See application file for complete search history.

(56) References Cited

U.S. PATENT DOCUMENTS

| 5,740,150 A | 4/1998 | Uchimaru et al. ........... 369/119 |
| 5,936,760 A | 8/1999 | Choi et al. ................... 359/298 |
| 6,201,629 B1 | 3/2001 | McClelland et al. ........ 359/223 |
| 6,311,894 B1 | 11/2001 | Miyajima et al. ...... 235/462.36 |

FOREIGN PATENT DOCUMENTS

| DE | 42 24 599 A1 | 2/1994 |
| EP | 0 417 523 A2 | 3/1991 |
| EP | 1 215 518 A1 | 6/2002 |
| JP | 8-220463 | 8/1996 |
| JP | 2001-33727 | 2/2001 |
| WO | WO 02/079853 A1 | 10/2002 |

OTHER PUBLICATIONS

Jocelyn T. Nee et al., "Stretched-Film Micromirrors for Improved Optical Flatness," MENS2000, pp. 704-709 (2000).

*Primary Examiner*—James Phan
(74) *Attorney, Agent, or Firm*—Fitzpatrick, Cella, Harper & Scinto

(57) ABSTRACT

There is disclosed a light deflector in which both ends of a movable plate is supported to a support substrate by an elastic support portion, a reflection surface is formed on one surface of the movable plate, and the movable plate is torsion-oscillated about a torsion axis of the elastic support portion as a center to deflect an incident light that enters the reflection surface, wherein a recessed portion is formed on at least one side surface of both sides, which is a surface on which the reflection surface is not formed, and between which the torsion axis of the elastic support portion is interposed.

4 Claims, 13 Drawing Sheets

LIGHT DEFLECTOR, METHOD OF MANUFACTURING LIGHT DEFLECTOR AND TORSION OSCILLATING MEMBER

This application is a division of application Ser. No. 10/188,809, filed Jul. 5, 2002 now U.S. Pat. No. 6,924,914, which is incorporated herein by reference.

BACKGROUND OF THE INVENTION

1. Field of the Invention

The present invention relates to a light deflector that deflects an incident light, a method of manufacturing the light deflector, an optical device using the light deflector, and a torsion oscillating member.

2. Related Background Art

Until now, in a mechanical element that requires high-speed operation, its inertia causes a factor that largely impedes a drive speed. In particular, a mechanical element that rotationally oscillates within a given angle is required to reduce an inertia moment. In this case, however, attention is generally paid to a prevention of the rigidity of the driven mechanical element from being deteriorated. For this purpose, there has been widely known a method in which the mechanical element is of a hollow structure, and a method of fixing a reinforcement material (hereinafter referred to as "rib").

By the way, in recent years, with the development of the microelectronics represented by the high integration of a semiconductor device, a variety of devices, which are high in function and small in sizes are produced. For example, an image display device such as a laser printer or a head mount display, which-conducts optical scanning by using a light deflector, and a light reading device such as an input device including a bar code reader etc. are also added with a high function and are made small in sizes. Those devices are still required to be more downsized. As the light deflector that satisfies the above-mentioned requirements, there has been proposed, for example, a light deflector that scans a light with employing a structure in which a micro mirror is torsion-oscillated by using the micro-machining technique.

The micro mirror used in the light deflector of this type is demanded to have two performances of high-speed drive and high rigidity. In particular, in the case where the rigidity of the micro mirror is short, the micro mirror receives an inertia force due to its weight to cause a mirror surface largely bend at the time of driving. Because the deflection remarkably deteriorates the optical characteristics of the mirror, the performance of the light deflector is lowered. Also, there are many cases in which the generating force of an actuator is restricted in the light reflector of this type, and when the spring rigidity of an elastic support portion is increased for the high-speed drive, there arises such a problem in that the deflection angle is remarkably deteriorated. For that reason, a reduction of the inertia moment of the micro mirror, which is a movable part is required in order to enlarge the light reflection angle.

Under the above circumstances, the following structure has been proposed in order to reduce the inertia moment while keeping the rigidity of the micro mirror. FIGS. 1A and 1B are diagrams showing a light reflector disclosed in "Proceedings of MENS2000," pp. 704–709. FIG. 1A is a perspective view showing a micro mirror portion, and FIG. 1B is a cross-sectional view taken along the line 1B—1B of FIG. 1A.

A mirror portion 1001 of the light deflector is structured in such a manner that a cylindrical rib 1004 of single crystal silicon is fixed onto a polycrystal silicon film 1003 on which a metal thin film 1002 for reflecting a light from a light source is formed. The mirror portion 1001 is coupled to a support substrate (not shown) through a torsion spring (not shown) of polycrystal silicon that is elastically supported so as to be torsion-oscillatable. The torsion spring is formed on the same plane as the polycrystal silicon film 1003 of the mirror portion 1001. In this light deflector, such a structure is employed in which the torsion spring is formed on the polycrystal silicon film 1003 on which the metal thin film 1002, which is a reflection surface, is formed, and the torsion spring is reinforced by the cylindrical rib 1004. With this structure, because the rigidity greatly increases as compared with a case using a single unit of the polycrystal silicon film 1003 as the mirror portion 1001, a micro mirror that is high in rigidity and low in inertia moment may be obtained.

However, the light deflector disclosed in the above-mentioned literature is implemented by using the cylindrical rib 1004, which is 13 µm in width and 15 µm in thickness, and the polycrystal silicon film 1003, which is 550 µm in diameter and 1.5 µm in thickness. Accordingly, in the conventional light deflector, the dynamic deflection is not sufficiently suppressed due to insufficient rigidity of the polycrystal silicon film 1003. If an attempt is made to further suppress the dynamic deflection without changing the structure of the conventional light deflector, there may be proposed the following two methods, which can be employed while taking manufacturing limits into consideration: a method of increasing the residual stress of the polycrystal silicon film 1003 and a method of increasing the thickness of the cylindrical rib 1004. However, both of those methods suffer from such a problem in that the performance of the light deflector is remarkably deteriorated for the reasons stated below.

1) In the case where the residual stress of the polycrystal silicon film 1003 is increased, the static flatness of the polycrystal silicon film 1003 cannot be obtained. In addition, a reflection surface formed on the polycrystal silicon film 1003 also has a large curve, thereby causing the deformation of the deflected light to deteriorate the reflection performance.

2) In the case where the thickness of the cylindrical rib 1004 is increased, the mass of a portion at which the moment arm is maximum, increases. As a result, the inertia moment greatly increases. Also, because the position of the center of gravity of the entire mirror portion 1001 is eccentric from the center axis of the torsion of the torsion spring (hereinafter referred to as "torsion axis"), unnecessary oscillations are liable to occur, thereby deteriorating the deflection performance.

SUMMARY OF THE INVENTION

The present invention has been made in view of the above-mentioned problems inherent in the related art, and therefore an object of the present invention is to provide a downsized light deflector which is capable of being driven at high speed; which takes a large deflection angle even by an actuator having a lower generation force; which is excellent in the static flatness of the reflection surface; and which is small in the distortion even at high-speed operation, a method of manufacturing the light deflector and an optical device using the light deflector.

Accordingly, the present invention provides a light deflector in which both ends of a movable plate are supported to a support substrate by an elastic support portion, a reflection surface is formed on one surface of the movable plate, and the movable plate is torsion-oscillated about a torsion axis of the elastic support portion as a center to deflect an incident light that enters the reflection surface, wherein a recessed portion is formed on at least one side surface of both sides, which is a surface on which the reflection surface is not formed, and between which the torsion axis of the elastic support portion is interposed.

Further, the present invention provides a light deflector in which both ends of a movable plate are supported on a support substrate by an elastic support portion, a reflection surface is formed on one surface of the movable plate, and the movable plate is torsion-oscillated about a torsion axis of the elastic support portion as a center to deflect an incident light that enters the reflection surface, wherein at least one of the surfaces, which is a surface of the movable plate opposite to the reflection surface, and between which the torsion axis of the elastic support portion is interposed, is made in a step configuration so as to gradually outwardly reduce the thickness of the movable plate.

Still further, the present invention provides a light deflector in which both ends of a movable plate is supported to a support substrate by an elastic support portion, a reflection surface is formed on one surface of the movable plate, and the movable plate is torsion-oscillated about a torsion axis of the elastic support portion as a center to deflect an incident light that enters the reflection surface, wherein a through-hole is formed on at least one of surfaces between which the torsion axis of the elastic support portion of the movable plate is interposed and in the periphery of the effective reflection region of the movable plate.

Further, the present invention provides a method of manufacturing a light deflector, comprising the steps of:

forming mask layers on both surfaces of a silicon substrate;

removing the mask layer on a surface where a reflection surface is formed, with the mask layers corresponding to the outer configuration portions of a support substrate, an elastic support portion and a movable plate being left unremoved;

removing the mask layer on an opposite side to the surface where the reflection surface is formed, with the mask layer corresponding to the outer configuration portions of a support substrate, an elastic support portion and a movable plate being left unremoved, and removing the mask layer on the recessed portion of the movable plate;

emerging the silicon substrate in an alkali aqueous solution and conducting an anisotropic etching process to separate the silicon substrate into the support substrate, the elastic support portion and the movable plate, and forming a recessed portion in one surface of the movable plate;

removing the mask layer on the silicon substrate; and forming a reflection film on the surface on which the reflection surface of the movable plate is formed.

Still further, the present invention provides a method of manufacturing a light deflector, comprising the steps of:

forming a mask layer on one surface of a silicon substrate;

forming a reflection film on a portion of the other surface of the silicon substrate on which a reflection surface is formed;

removing the mask layer formed on the silicon substrate portions where a support substrate, an elastic support portion and a movable plate are formed being left unremoved, and etching the regions of the silicon substrate, with the regions the support substrate, the elastic support portion and the movable portion being left unetched, to a given depth through a dry etching process;

repeatedly conducting the removal of the recessed portion of the mask layer formed on the silicon substrate and the etching of the given depth due to the dry etching of the silicon substrate in accordance with the number of recessed portions formed on the movable plate in a direction crossing the torsion axis of the elastic support portion, to thereby separate the silicon substrate into the support substrate, the elastic support portion and the movable plate, and to form on the movable plate a plurality of recessed portions that gradually outwardly increase its diameter and its depth from the torsion axis; and removing the mask layer of the silicon substrate.

Yet further, the present invention provides a method of manufacturing a light deflector, comprising the steps of:

forming a mask layer on one surface of a silicon substrate;

forming a reflection film on a portion of the other surface of the silicon substrate on which a reflection surface is formed;

removing the mask layer formed on the silicon substrate portions where a support substrate, an elastic support portion and a movable plate are formed being left unremoved, and etching the regions of the silicon substrate, among the regions the support substrate, the elastic support portion and the movable portion being left unetched, to a given depth through a dry etching process;

repeatedly conducting the removal of a flat portion of a step configuration portion of the mask layer formed on the silicon substrate and the etching of the given depth due to the dry etching of the silicon substrate in accordance with the number of step configurations formed on the movable plate, to thereby separate the silicon substrate into the support substrate, the elastic support portion and the movable plate, and to form on the movable plate step portions that gradually outwardly increase its diameter and its depth from the torsion axis; and removing the mask layer of the silicon substrate.

In addition, an object of the present invention provides a torsion oscillating member comprising a movable plate, a shaft and a support substrate, in which the movable plate is supported to the support substrate by the shaft connected to both ends of the movable plate, and the movable plate is torsion-oscillatable about the shaft as a center, wherein a recess is formed on at least one region of both sides between which a region on the extension of the shaft is interposed on one face of the movable plate.

BRIEF DESCRIPTION OF THE DRAWINGS

These and other objects and advantages of this invention will become more fully apparent from the following detailed description taken with the accompanying drawings.

DETAILED DESCRIPTION OF THE PREFERRED EMBODIMENTS

Now, a description will be given in more detail of preferred embodiments of the present invention with reference to the accompanying drawings.

First Embodiment

Figure 2:
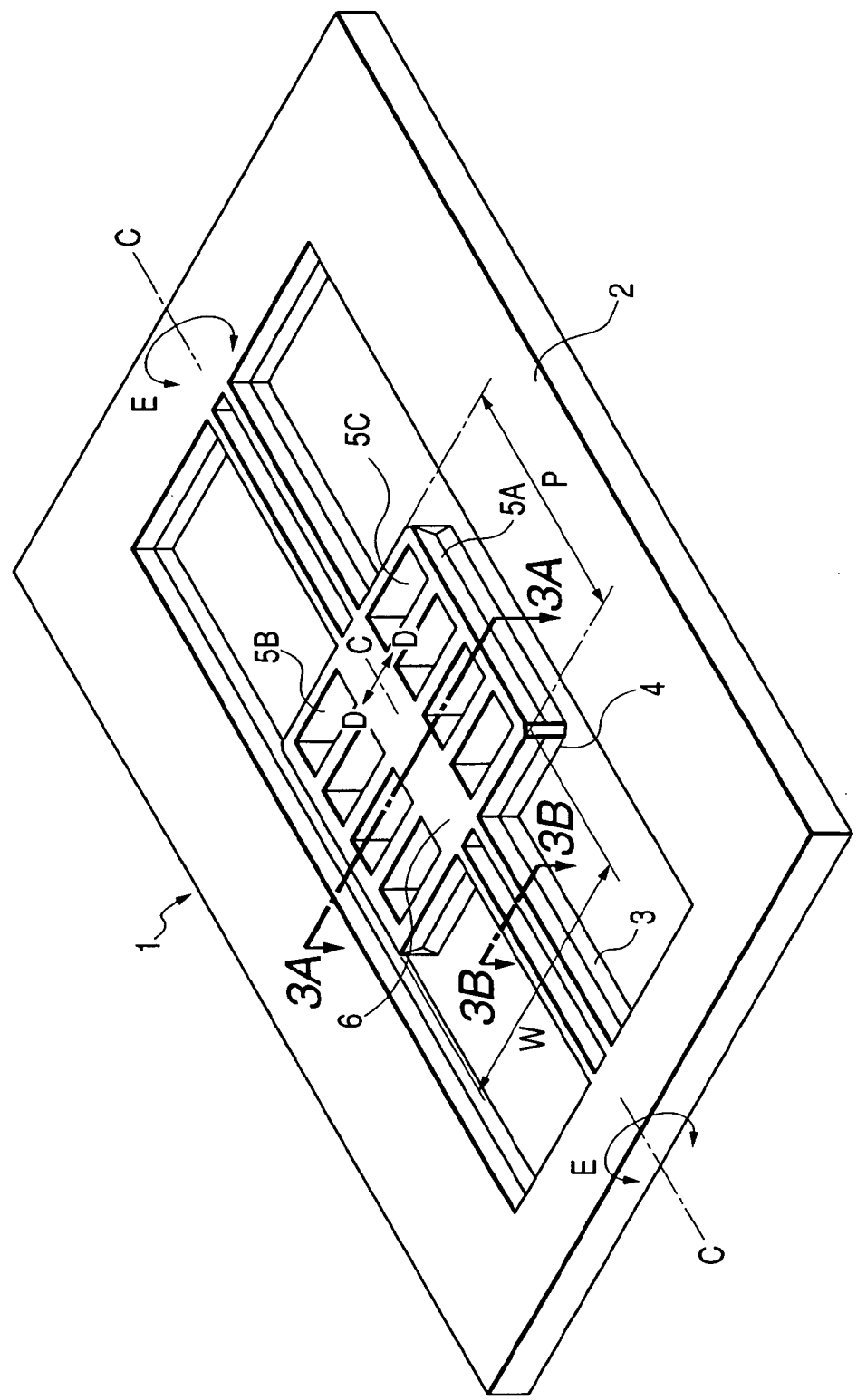
FIG. 2 is a perspective view showing a light deflector in accordance with a first embodiment of the present invention.

FIG. 2 is a perspective view showing the structure of a light deflector that is an example of a torsion oscillating member in accordance with a first embodiment of the present invention. Referring to FIG. 2, a light deflector 1 is structured in such a manner that both ends of a movable plate 6 are supported to a support substrate 2 by an elastic support body (torsion spring) 3 corresponding to a torsion oscillating motion shaft. The torsion spring 3 supports the movable plate 6 so as to be torsion-oscillatable elastically in directions E, that is, in both of a clockwise direction and a counterclockwise direction with a shaft C (that is, the torsion axis) as a center. Also, one surface of the movable plate 6 forms a reflection surface 4 (a back side of the drawing and not shown), and deflects an incident light that enters the reflection surface 4 by a given displacement angle due to the torsion of the movable plate 6 in the direction E. Because the movable plate 6 has its both ends connected to the torsion spring 3, respectively, the movable plate 6 is supported by a support substrate 2. Also, the movable plate 6 torsion-oscillates but does not rotate with the shaft C as a center. Also, a direction indicated by an arrow E in FIG. 2 is directed in parallel with a surface that is perpendicular to the torsion axis C, on which the reflection surface 4 of the movable plate 6 is formed, and in particular, the direction indicated by the arrow E is called "a direction away from the torsion axis" in the present specification.

In this embodiment, the support substrate 2, the movable plate 6, the reflection surface 4, the torsion spring 3 and a recessed portions 5A, 5B and 5C that will be described later are integrally formed with each other by single crystal silicon through the micro-machining technique applying a semiconductor manufacturing technique.

The recessed portion 5A is formed in the movable plate 6 in such a manner that a surface whose normal is along the direction D (hereinafter referred to as "side surface", and the side surface means a reflection surface of the movable plate 6, that is, a side surface with respect to a rear surface not shown in the figure) is recessed, and a plurality of recessed portions 5B and 5C are formed in a surface where no reflection surface 4 of the movable plate 6 is formed (hereinafter referred to as "rear surface") in such a manner that both sides of the torsion axis have a recess structure. Therefore, the movable plate 6 is the thickest in the vicinity of the torsion axis C, and in this embodiment, no recessed portion is formed on the torsion axis C, that is, a region positioned on the rear surface of the movable plate 6 on the extension of the torsion spring 3. Then, the mass of the movable plate 6 that supports the reflection surface 4 becomes smaller as the movable plate 6 is far from the torsion axis.

Figure 3A:
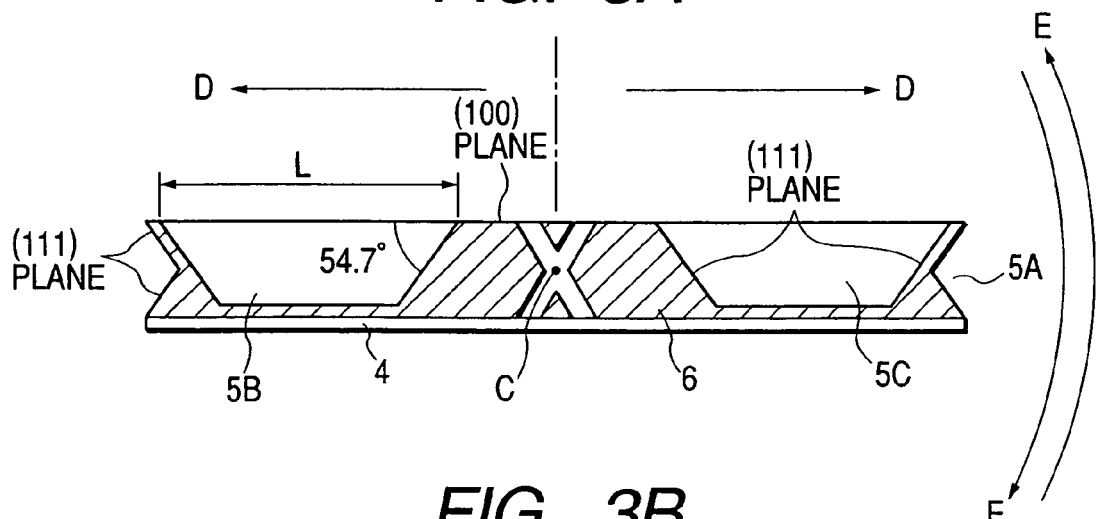
FIGS. 3A and 3B are cross-sectional views taken along a line 3A—3A and a line 3B—3B of FIG. 2, respectively.
Figure 3B:
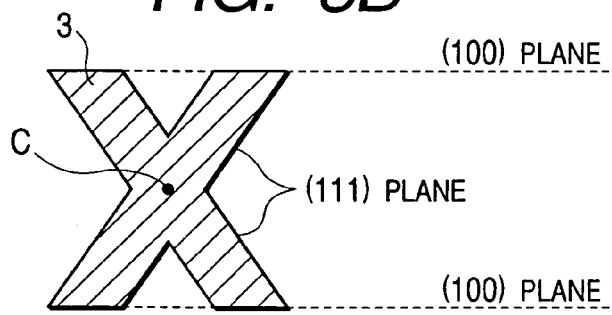

FIG. 3A is a cross-sectional view taken along a line 3A—3A of FIG. 2, and FIG. 3B is a cross-sectional view taken along a line 3B—3B. The respective surfaces of the torsion spring 3 and the recessed portions 5A, 5B and 5C are structured by (111) plane of the single crystal silicon wafer that becomes a member as shown in FIGS. 3A and 3B. Because the (100) plane and the (111) plane of silicon are arranged at an angle of about 54.7° as shown in the figure, it is possible to structure the side wall and the rear surface of the movable plate 6 in recessed shapes by the (111) plane as shown in FIG. 3A. Also, the cross-section taken along a line 3B—3B of the torsion spring 3 forms an X-shaped section surrounded by the (111) plane and the (100) plane as shown in FIG. 3B. Referring to FIG. 2, a recessed portion due to the X-shaped structure of the torsion spring 3 is shown in the top view of the torsion spring 3. The recessed portion is so disposed as to extend in the torsion axial direction of the torsion spring 3, but does not extend up to the support substrate 2 and the movable plate 6.

Also, in this embodiment, the movable plate 6 is lightened as much as the recessed portions 5A, 5B and 5C as compared with a case the movable plate 6 is shaped in a simple rectangular parallelepiped, and the inertia moment at the time of torsion oscillation becomes small. In particular, because the inertia moment is determined by the total sum of the products of the mass of the movable plate 6 and the square of a distance of the movable plate 6 from the torsion axis C, the mass of silicon of the movable plate 6 that supports the reflection surface 4 is reduced more as the movable plate 5 is far from the torsion axis C as in the recessed portions 5A, 5B and 5C, thereby being effectively reducing the inertia moment.

On the other hand, paying attention to the solid portion of the movable plate 6, the solid portion increases toward a position closer to the torsion axis C due to the recessed portions 5A, 5B and 5C. Because a large deflection moment is applied to the movable plate 6 more as the movable plate 6 is closer to the torsion axis C at the time of torsion oscillation, the structure of the recessed portions 5B and 5C (shape or size) is appropriately set with the result that the rigidity of the movable plate 6 is hardly adversely affected by the formation of the recessed portions 5A, 5B and 5C. In addition, as shown in FIG. 2, the recessed portions 5A, 5B and 5C of the movable plate 6 are arranged in lines along the torsion axis C, and because the solid portions that remain between the lines shape ribs, the movable plate 6 can be effectively supported. In this way, the light deflector 1 of this embodiment can reduce the inertia moment while sufficiently keeping the rigidity of the movable plate 6.

Incidentally, in the light deflector in accordance with this embodiment which is the torsion oscillating member that requires high-speed driving, there is required that the inertia moment is reduced while the rigidity of the movable plate 6 is highly kept, and in view of this, this embodiment is very useful for the reasons stated below.

Figure 4A:
FIGS. 4A and 4B are diagrams for an explanation of the deformation of a movable plate shown in FIG. 2.

The light deflector 1 according to this embodiment is driven with, for example, a frequency 22 kHz which is a resonance frequency of the movable plate 6 and a variable angle ±11.7° of the movable plate 6. The movable plate 6 is deformed by receiving the inertia force caused by its weight due to the torsion oscillation. FIG. 4A is a cross-sectional view showing the movable plate 6 in the case where the torsion axis C when the movable plate 6 is a flat plate (rectangular parallelepiped) is normal.

Figure 4B:
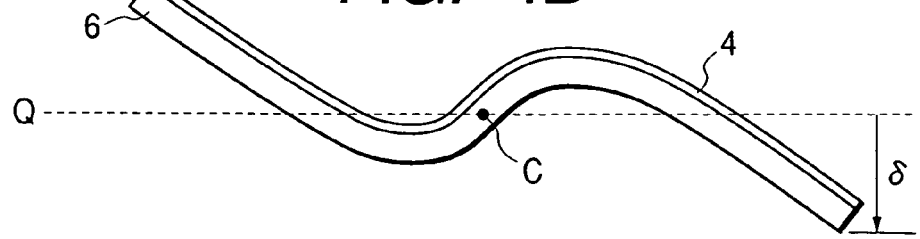

Because the movable plate 6 according to this embodiment generates the torsion oscillation excited at the resonance frequency, the displacement angle of the movable plate 6 with respect to a time changes in a sine wave shape. Then, the largest deformation occurs at a portion where the highest angular acceleration is effected (for example, if all of the sine wave shaped oscillations are set as the applied region of the light deflector, the portion is in the vicinity of the largest displacement angle). FIG. 4B shows the appearance of the deformation of the movable plate 6 in this situation. As shown in FIG. 4B, when the movable plate 6 is deformed, the reflection surface 4 formed on the movable plate 6 is deformed likewise. In the case where the deformation is remarkable, the optical characteristic exhibited as the light deflector is remarkably deteriorated without ensuring the flatness of the reflection surface 4 over the applied region of the light deflector.

When a laser having the Gaussian distribution is made incident onto the uneven reflection surface, the shape of a beam spot reflected by the unevenness and formed is deformed. The deformation of the beam spot deteriorates the optical characteristic of the light deflector. As shown in FIG. 4B, the reflection surface 4 deformed (undulated) can be regarded as a reflection surface where the means plain face Q is calculated from the reflection surface 4 through the least square, and the reflection surface of the face Q has the unevenness of the deformation profile of the reflection surface 4. Therefore, an amount farthest from the face Q is taken as the representative value of the deflection amount of the reflection surface 4, and a distance of that portion of the reflection surface 4 from the face Q is set as the maximum deflection amount $\delta$.

Figure 5:
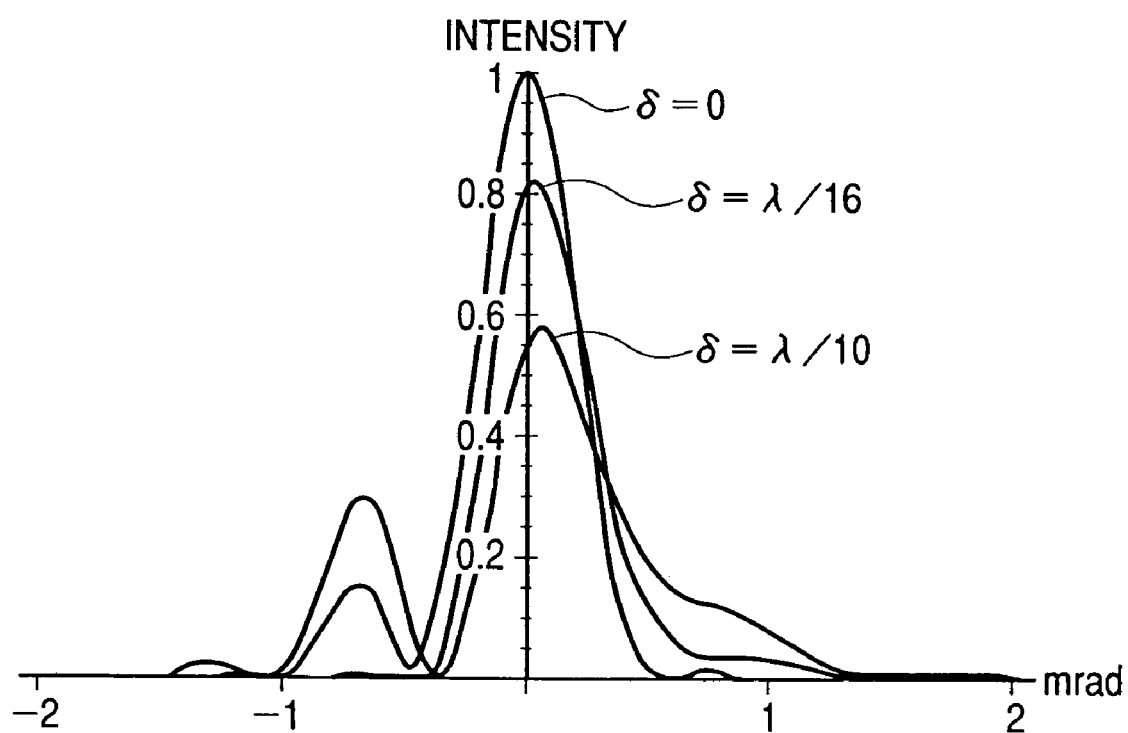
FIG. 5 is a graph showing a relationship between an extending angle of the movable plate shown in FIG. 2 from a reflection surface and the relative intensity of a beam spot with a parameter as a deflection amount δ.

The beam spot reflected and formed by the reflection surface 4 whose inner portion has the width W=1 mm from the intensity contour which becomes $1/e^2$ (e is a natural logarithm) of the maximum intensity of the beam spot of the laser having a wavelength $\lambda$ is calculated with the results shown in FIG. 5. FIG. 5 shows a relationship between the expanding angle from the reflection angle 4 and the relative intensity of the beam spot at that time (the center peak value at the time of $\delta=0$ is set as 1) in the case of $\delta=0$, $\delta=\lambda/16$ and $\delta=\lambda/10$. As is apparent from FIG. 5, as the deflection amount $\delta$ of the reflection surface 4 increases, the center peak of the beam spot on a screen decreases, and a second peak remarkably appears at a position slightly apart from the center. Also, a tendency is made to increase the expansion of the bottom of the spot.

The center peak is lowered to about 0.8 in the relative intensity at the time of $\delta=\lambda/16$ and about 0.5 in the relative intensity at the time of $\delta=\lambda/10$. At the same time, the second peak is lowered to 0.15 in the relative intensity at the time of $\delta=\lambda/16$ and 0.3 in the relative intensity at the time of $\delta=\lambda/10$. In this way, when a difference in the intensity between the second peak and the center peak is reduced, the beam spot is observed as an envelope shaped spot formed by the center peak and the second peak. As a result, the apparent beam spot is enlarged, to thereby lead to a remarkable deterioration of the resolution of the light deflector. Therefore, unless the maximum deflection amount $\delta$ must be set to $\lambda/16$ or lower such that the second peak is the intensity of about 20% of the center peak, and the relative intensity of the center peak is about 0.8, the resolution is largely adversely affected by the maximum deflection amount.

Subsequently, the simulation results of the light deflector having a recessed portion in the movable portion 6 as in this embodiment and a light deflector having no recessed portion will be described. First, the movable plate 6 of the light deflector, according to this embodiment is designed such that the width W is set to 1300 μm, the length P is set to 1100 μm, and the thickness t is set to 200 μm. Also, as shown in FIG. 3A, the recessed portion 5A formed by the recessed (111) plane is set to about 75 μm in the depth, the recessed portions 5B and 5C are set to about 0.180 μm in the depth, the pitches of the respective recessed portions are set to 270 μm, and other dimensions are indicated in FIG. 3A.

Also, there are provided the movable plates having the length L of the recessed portions 5B and 5C changed to 0 μm (that is, the recessed portions 5B and 5C are not formed on the rear surface of the movable plate 6, and only the recessed portion 5A is formed on the side surface), 250 μm, 400 μm, 500 μm and 600 μm, respectively. It is assumed that the length L is changed in a direction indicated by an arrow toward the inner side of the movable plate 6 from the end portion thereof as shown in FIG. 3A. The effects of this embodiment will be described on the basis of the simulation result by comparing a case of the respective movable plates different in the length L with a case of a rectangular parallelepiped having no recessed portion.

Figure 6A:
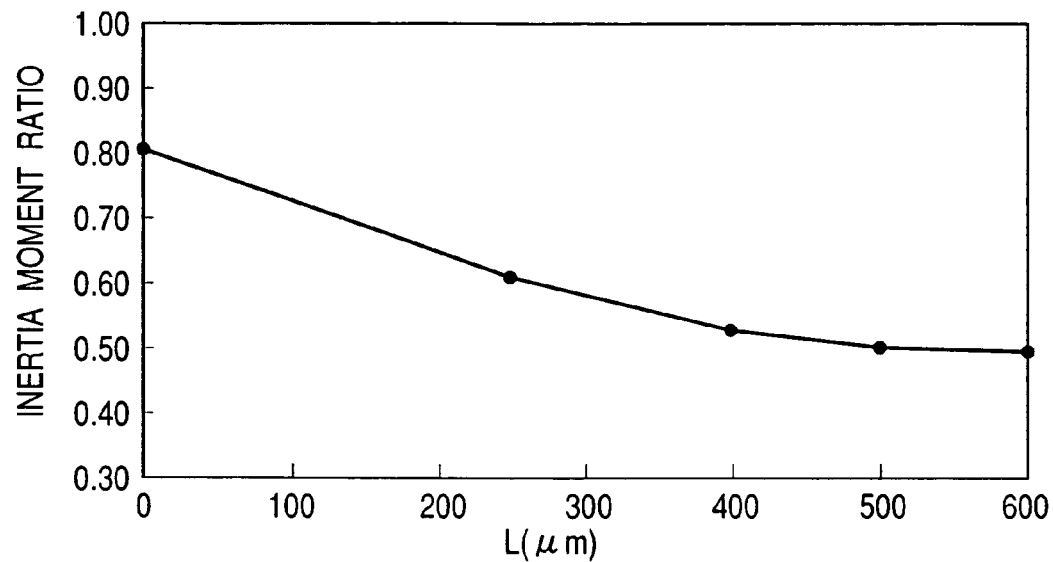
FIGS. 6A and 6B are graphs showing the simulation results of changes in an inertia moment and the maximum deflection amount δ in the case where the length L of a recessed portion of the movable plate is changed.
Figure 6B:
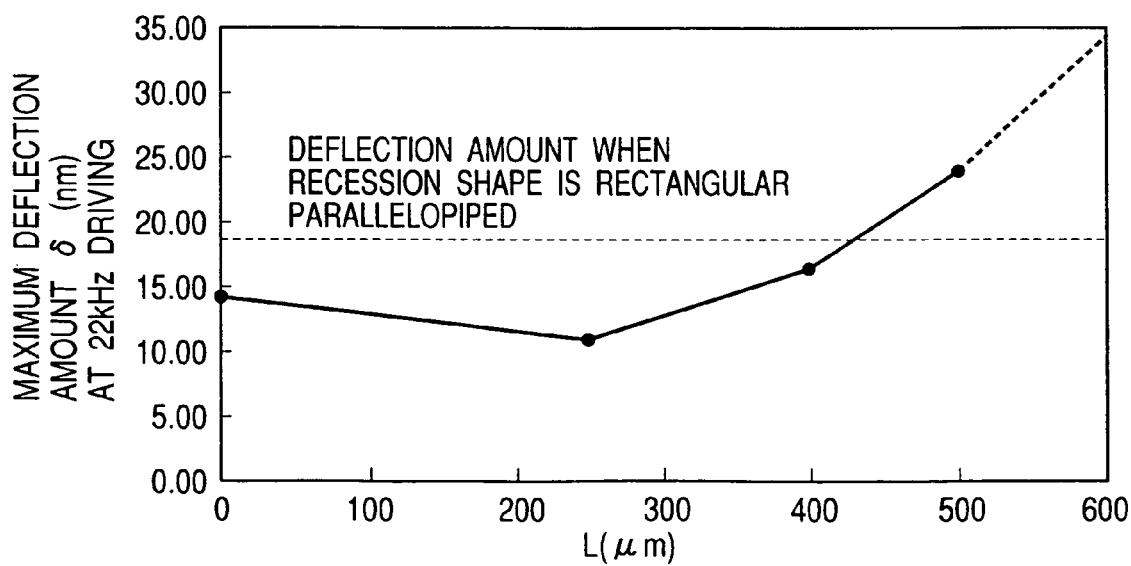

FIGS. 6A and 6B show the simulation results of a reduced amount of the inertia moment (ratio: when the shape of the recessed portions 5B and 5C are rectangular parallelepiped, the value is 1) in the case where the length L of the recessed portions 5B and 5C of the movable plate 6 is changed and the maximum deflection amount $\delta$ at the maximum displacement angle at the time of driving with the frequency 22 kHz and the displacement angle of the movable plate ±11.7°, respectively.

As is apparent from FIG. 6A, in the case where the recessed portion 5A is formed on the side surface of the movable plate (L=0), the inertia moment of about 20% can be reduced as compared with the rectangular parallelepiped. Also, recessed portions 5B and 5C are formed and the inertia moment can be reduced more as the lengths L of the formed recessed portions 5B and 5C are longer, and for example, the inertia moment can be reduced down to about 50% as compared with the rectangular parallelepiped in the case of L=500 μm. The inertia moment is reduced by only about 1% as compared with the case of L=500 μm and L=600 μm, and therefore it is desirable to form the recessed portions 5B and 5C at portions apart from the torsion axis C in effectively reducing the inertia moment.

FIG. 6B shows a relationship of the length L of the recessed portions 5B and 5C and the maximum deflection amount $\delta$. As is apparent from FIG. 6B, it is understood that between L=0 μm and L=400 μm, the maximum deflection amount $\delta$ becomes smaller than that in the case where the shape of the recessed portions 5B and 5C are rectangular parallelepiped. Also, in the case where the lengths L of the recessed portions 5B and 5C are longer than L=400 µm, a tendency is made to remarkably increase the maximum deflection amount, and it is found that the rigidity of the movable plate is remarkably deteriorated with the provision of the recessed portions 5B and 5C at the portions closed to the torsion axis C.

Therefore, as is apparent from FIGS. 6A and 6B, even in the case where only the recessed portion 5A is formed on the side surface of the movable plate 6, the inertia moment can be reduced by about 20% as compared with the case of the rectangular parallelepiped, and the maximum deflection amount δ can be also reduced by about 23%. In the case of further forming the recessed portions 5B and 5C, an optimum shape can be obtained so that the maximum deflection amount δ starts to rapidly increase, and the inertia moment can be largely reduced in the vicinity of L=400 µm indicative of a tendency that the inclination of a reduction of the inertia moment is gradually lowered, and the maximum deflection amount δ can be made substantially equal to that of the rectangular parallelepiped.

However, the maximum deflection amount δ has various allowable values depending on the wavelength of a light made incident onto the light deflector, and if there is considered a case in which the light of, for example, wavelength 440 nm is deflected in this embodiment, the allowable maximum deflection amount δ becomes λ/16=about 27.5 nm, and the shape close to L=500 µm is that the inertia moment of the movable plate 6 can be most reduced without a remarkable reduction in the resolution caused by the maximum deflection amount δ. As described above, in this embodiment, since the inertia moment can be reduced while keeping the high rigidity of the movable plate 6, it can sufficiently cope with the high-speed driving as described above.

Figure 7A:
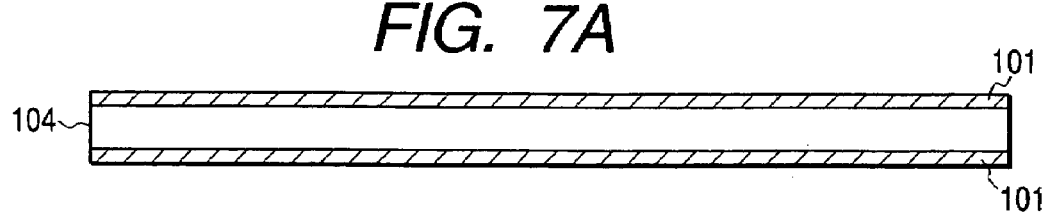
FIGS. 7A, 7B, 7C, 7D and 7E are diagrams for an explanation of a method of manufacturing the light deflector shown in FIG. 2.

Subsequently, a method of manufacturing the light deflector 1 according to this embodiment will be described with reference to FIGS. 7A to 7E. FIGS. 7A to 7E are process diagrams showing the manufacturing method of the light deflector 1 according to this embodiment due to anisotropic etching using an alkali aqueous solution. First, as shown in FIG. 7A, mask layers 101 of silicon nitride are formed on both surfaces of a flat silicon substrate 104 through a low-pressure chemical vapor deposition or the like.

Figure 7B:
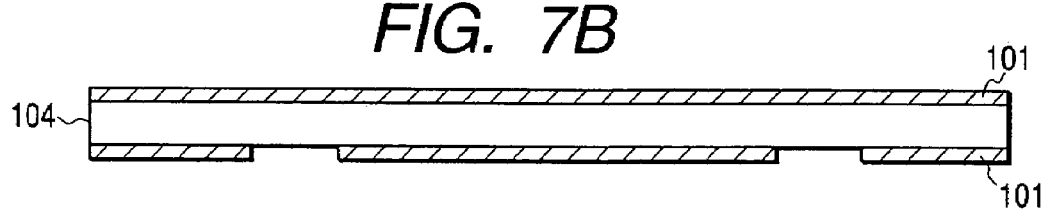
Figure 7C:
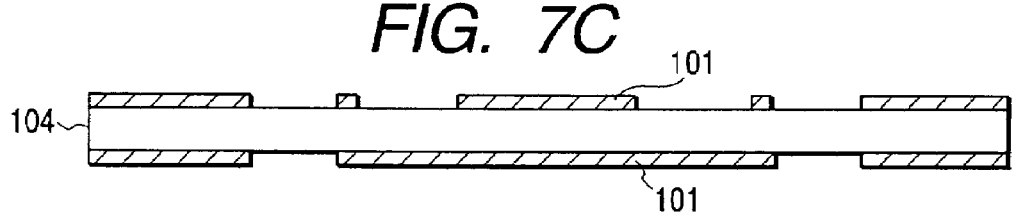

Subsequently, as shown in FIG. 7B, a surface of the mask layer 101 on which the reflection surface 4 is formed is patterned in accordance with the outer configurations of portions where the support substrate 2, the movable plate 6 and the torsion spring 3 will be formed. This patterning is conducted by normal photolithograph and a dry etching process using a gas (for example, $CF_4$) that erodes silicon nitride. Also, as shown in FIG. 7C, a surface of the mask layer 101 on which the reflection surface 4 is not formed is patterned in accordance with the outer configurations of the support substrate 2, the movable plate 6, the torsion spring 3 and the recessed portions 5B and 5C. Similarly, in this case, the patterning is conducted in the same manner as that shown in FIG. 7B.

Figure 7D:
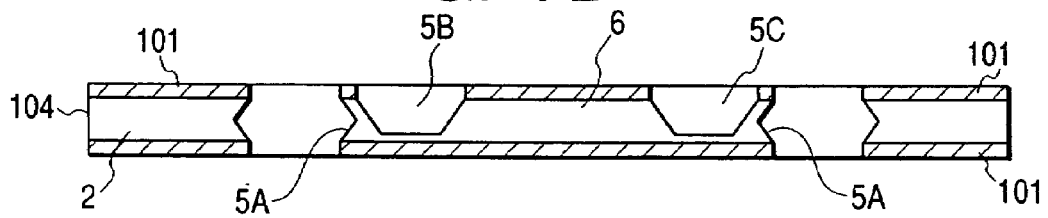

Subsequently, as shown in FIG. 7D, the product is immersed in an alkali aqueous solution (for example, potassium hydroxide aqueous solution, tetramethylammonium hydroxide aqueous solution or the like) remarkably different in a rate at which the product corrodes by the crystal face of the single crystal silicon for a desired period of time, to thereby conduct the anisotropic etching process, thus forming the support substrate 2, the movable plate 6, the torsion spring 3 and the recessed portions 5A, 5B and 5C shaped as shown in FIG. 7D. Because the anisotropic etching is processed in such a manner that the etching rate is high on the (100) plane and low on the (111) plane, etching is advanced from both the front surface and the rear surface of the silicon substrate 104, to thereby make it possible to accurately process the produce into a shape surrounded by the (100) plane and the (111) plane of a portion covered with the mask layer 101 due to a relationship between the pattern of the mask layer 101 and the crystal face of silicon. That is, the recessed portions 5B and 5C made up of the (111) plane are formed on the rear surface of the movable plate 6 due to the alkali anisotropic etching, and the recessed portion 5A made up of the (111) plane is formed on the side face of the movable plate 6, and at the same time, the torsion spring 3 is processed in an X-shaped polygon (refer to FIG. 3B) surrounded by the (100) plane and the (111) plane through that etching process.

Figure 7E:
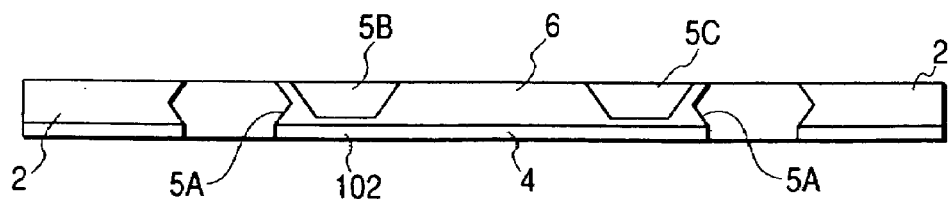

Then, as shown in FIG. 7E, the mask layer 101 of silicon nitride is removed, and a metal (for example, aluminum or the like) having a high reflectance is further vacuum-deposited as the reflection surface 4. Through the above manufacturing method, the movable plate 6 in which the support substrate 2 and the recessed portions 5A, 5B and 5C are formed and the torsion spring 3 are formed integrally with each other (according to the manufacturing method of this embodiment, the reflection surface 4 is further integrated with those members), to thereby complete the light deflector shown in FIG. 2.

The light deflector 1 according to this embodiment is designed such that the movable plate 6 is elastically supported so as to be torsion-oscillatable about the torsion axis C by the torsion spring 3, and the reflection surface 4 formed on the movable plate 6 is continuously torsion-oscillated by a driving means (not shown), thereby being capable of deflecting and scanning the incident light.

Also, a recessed portion made up of the (111) plane of silicon is formed on the side surface and the rear surface of the movable plate 6, thereby being capable of reducing the inertia moment of the movable plate 6 while keeping a desired specification value using the deflection amount of the movable plate 6 as the light deflector. In particular, the section of the torsion spring 3 is formed in the X-shaped polygon made up of the (100) plane and the (111) plane of silicon, to thereby make it possible to elastically support the movable plate 6 in such a manner that the movable plate 6 is liable to twist about the torsion axis C and is difficult to bend in a direction perpendicular to the torsion axis C. The movable plate 6 makes it difficult to generate unnecessary oscillations other than the torsion oscillation about the torsion axis C due to the torsion spring 3 made up of the X-shaped section, and the light deflector small in disturbance can be realized.

In addition, according to the manufacturing method of the light deflector 1 of this embodiment, since both structures of the movable plate 6 and the torsion spring 3 can be processed by one alkali anisotropic etching process, mass production can be made very inexpensively. Also, because the design can be changed by adjusting the mask pattern of photolithograph and the etching period of time, the light deflector can be manufactured increasingly inexpensively and with a shorten duration of development. In addition, because the shapes of the movable plate 6 and the torsion spring 3 are determined by the (111) plane of single crystal silicon, it is possible to conduct the processing with a high precision.

Also, single crystal silicon not only has the material characteristics that are very suitable for the movable plate of the deflector because of the small density and the high Young's modulus, but also obtains an optically smooth surface by using the mirror ground surface of silicon wafer.

In FIG. 2, the reflection surface 4 is used as the light deflector element, but even if the reflection surface 4 is used as a reflection type diffraction grating, the light deflector that conducts the same operation due to the torsion oscillation of the movable plate 6 can be structured. In this case, because the deflection light becomes a diffraction light with respect to the incident light, a plurality of deflection lights can be obtained by one beam. In the following embodiment, in particular, a case in which the light deflection element is set as the reflection surface 4 will be described, but in all of the following embodiments, the light deflection element may be replaced by the reflection diffraction grating.

Second Embodiment

Figure 8:
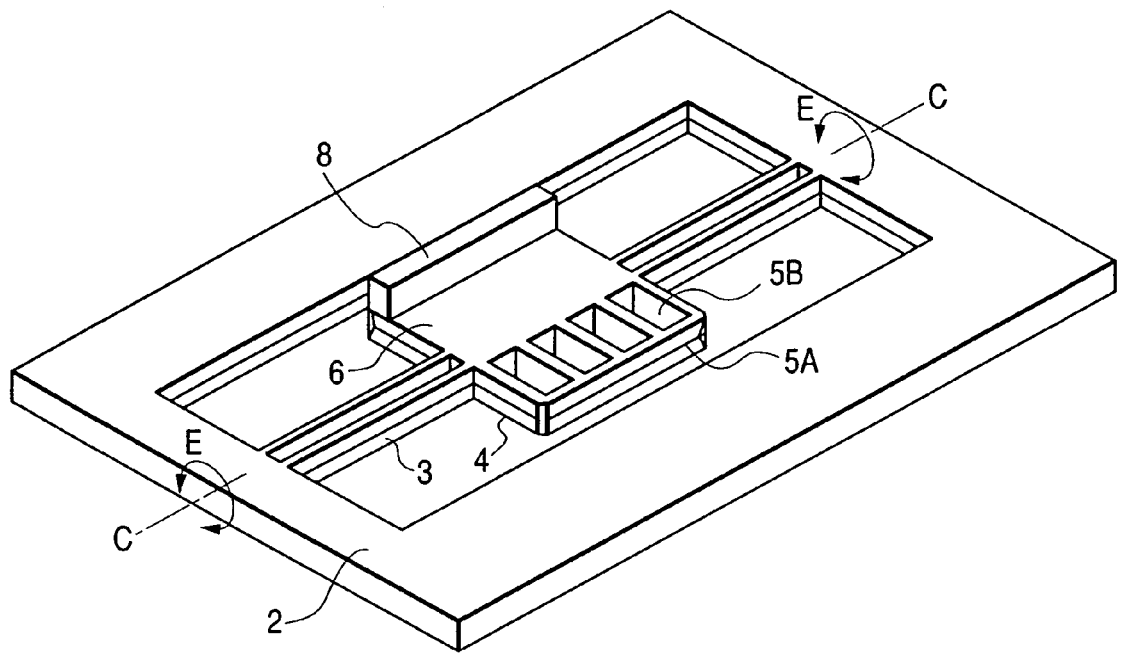
FIG. 8 is a perspective view showing a light deflector in accordance with a second embodiment of the present invention.

FIG. 8 is a perspective view showing the light deflector in accordance with a second embodiment of the present invention. A difference of FIG. 8 from FIG. 2 resides in that a recessed portion for reducing the inertia moment is formed on only one side of the movable plate 6 through the torsion axis, and a movable core 8 that is a part of the actuator is disposed at a side where the recessed portion of the movable plate 6 is not formed. Other structures are identical with those in FIG. 2. The movable core 8 is made of a soft magnetic body (for example, Fe—Ni alloy) or a hard magnetic body (for example, Ni—Co—P alloy), and its dimensions are, for example, 200 μm in width, 50 μm in thickness and 1100 μm in length. The movable core 8 is arranged to extend in a direction of the shaft C on one end of the movable plate 6. The movable core 8 is a member different from the movable plate 6 and stuck onto the movable plate 6. Then, a fixed core (so-called electromagnet) on which a coil for sucking the movable core 8 and generating a torque in the movable plate 6 is wound is located outside of the support substrate 2, and the movable plate 6 is driven by an electromagnetic force by energizing the coil. In this sway, even in the structure having the movable core 8 on one side thereof, the inertia moment of the movable plate 6 can be reduced.

Also, as the method of manufacturing the light deflector according to this embodiment, the manufacturing method shown in FIGS. 7A to 7E can be employed. In a process of FIG. 7C, a part of the mask layer 101 corresponding to the recessed portion 5C remains. Then, the processes of FIGS. 7D and 7E are sequentially conducted, thereby being capable of forming the recessed portion 5B on only one side as shown in FIG. 8. Thereafter, the movable core 8 is made to adhere to the other side of the movable plate 6, for example, with an adhesive, to thereby complete the light deflector of this embodiment. The adhesion may be made by heating or by irradiating of ultraviolet rays.

Third Embodiment

Figure 9:
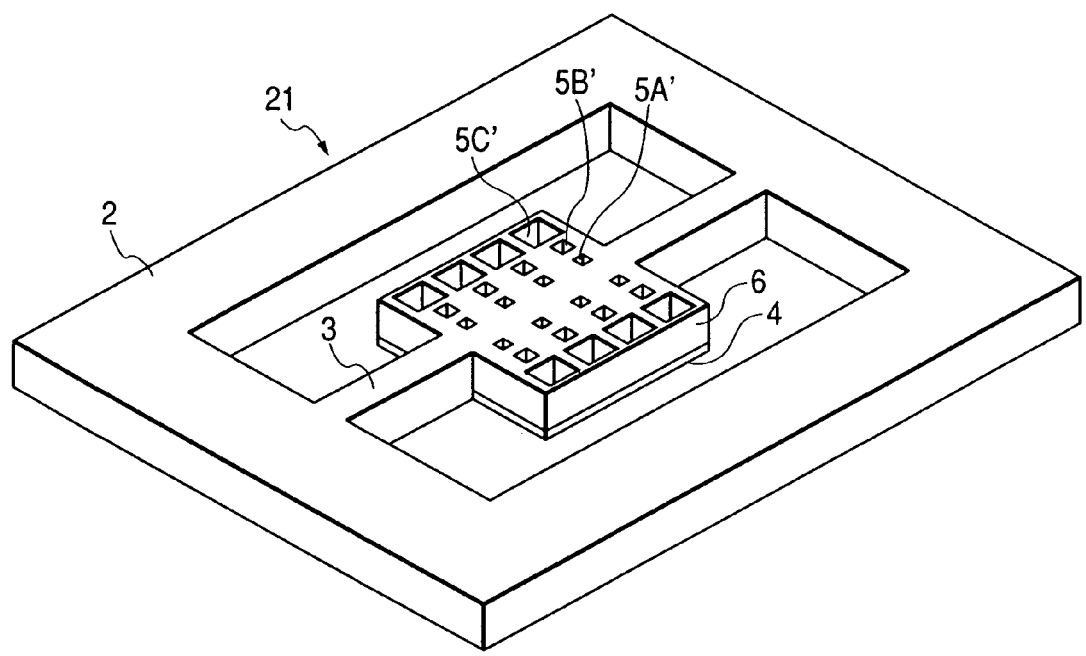
FIG. 9 is a perspective view showing a light deflector in accordance with a third embodiment of the present invention.

FIG. 9 is a perspective view showing a light deflector in accordance with a third embodiment of the present invention. In FIG. 9, the same parts as those of FIG. 2 are designated by like reference. In a light deflector 21 according to this embodiment, the respective rows of the recessed portions 5A', 5B' and 5C' are formed on a surface of the movable plate 6 opposite to the reflection surface 4 on both sides of the torsion axis along the axial direction. In this embodiment, the respective recessed portions in a direction perpendicular to the axial direction are designed such that the opening of the recessed portion farther from the shaft is more widened. Also, the support substrate 2, the torsion spring 3 and the reflection surface 4 are identical with those shown in FIG. 2, and the support substrate 2, the torsion spring 3, the movable plate 6, the recessed portions 5A', 5B' and 5C' are integrally formed with each other by single crystal silicon through the micro-machining technique applying the semiconductor manufacturing technique as in the first embodiment. The torsion spring 3 is preferably shaped in the X-shaped section as described in FIG. 3B, but is not in the X-shaped section in FIG. 9 for convenience and shaped in a rectangular parallelepiped having no recessed portion.

Figure 10A:
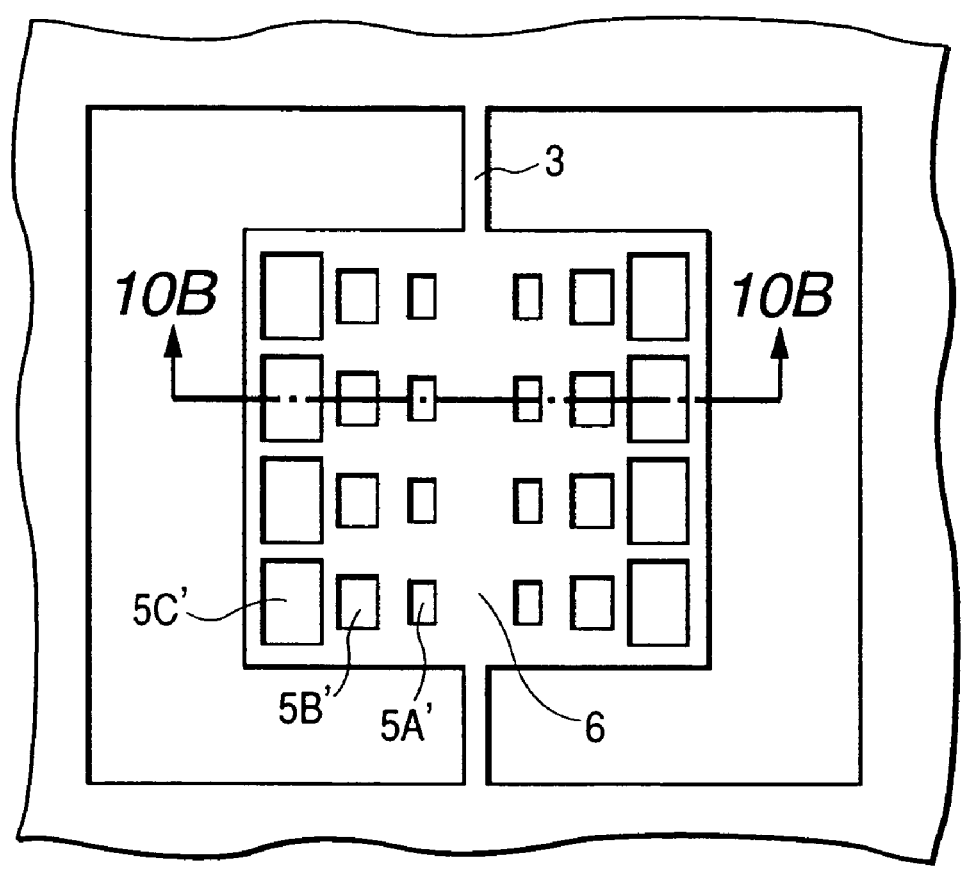
FIGS. 10A and 10B are a plan view and a cross-sectional view showing the movable plate shown in FIG. 9.
Figure 10B:
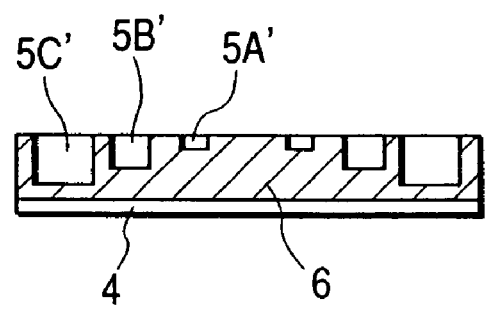

FIG. 10A is a plan view of a portion close to the movable portion 6 shown in FIG. 9, and FIG. 10B is a cross-sectional view taken along a line 10B—10B of FIG. 10A. This embodiment is structured in such a manner that the ratio of the recessed portion formed in the movable plate 6 increases more toward positions farther from the torsion axis C of the torsion spring 3. In other words, as shown in FIGS. 10A and 10B, the diameter (opening area) and the depth of the recessed portions increase more toward the outer peripheral direction of the movable plate 6 in the stated order of the recessed portions 5A', 5B' and 5C'.

For that reason, the movable portion 6 is lightened as much as the recessed portions 5A', 5B' and 5C', thereby being capable of reducing the inertia moment at the time of torsion oscillation. In particular, because the inertia moment is determined by the total sum of the products of the mass of the movable plate 6 and the square of a distance of the portion of the movable plate 6 from the rotary shaft, the capacity of the recessed portions increases more toward the positions farther from the torsion axis in the stated order of the recessed portions 5A', 5B' and 5C', thereby being capable of effectively reducing the inertia moment.

On the other hand, paying attention to the solid portion of the movable plate 6, the solid portion increases toward a position closer to the torsion axis due to the recessed portions 5A', 5B' and 5C'. Because a larger deflection moment is applied to the movable plate 6 as the portion of the movable plate 6 is closer to the torsion axis at the time of torsion oscillation, this structure does not substantially permit the rigidity of the movable plate 6 to be adversely affected by the formation of the recessed portions 5A', 5B' and 5C'. In addition, as shown in FIG. 10A, the recessed portions 5A', 5B' and 5C' are formed in rows along a direction perpendicular to the torsion axis, and the solid portions that remain between the rows are shaped in ribs with the result that the movable plate 6 can be effectively supported.

In this way, because the light deflector 21 of this embodiment can reduce the inertia moment while sufficiently keeping the rigidity of the movable plate 6, the dynamic deflection of the movable plate 6 and the reflection surface 4 formed on the movable plate 6 at the time of torsion oscillation can be reduced. Similarly, in this embodiment, it is possible that the recessed portions 5A', 5B' and 5C' are formed on only one side of the movable portion 6, and a movable core 8 is disposed on the other side thereof as in the second embodiment. Also, a recessed portion may be formed on the side surface of the movable plate 6.

In the light deflector 21 according to this embodiment, for example, the reflection surface 4 is set to 1 mm×1 mm in size, the light maximum deflection angle is set to about 35 degrees, the resonance frequency of the light deflector is set to about 22 kHz, the width of the torsion spring 3 is set to 75 µm, and the length of one side of the torsion spring 3 is set to 3000 µm. In the first embodiment, the thickness of the movable plate 6 and the torsion spring 3 are set to 200 µm that is the same as that of the support substrate 2, but if a portion on which the torsion spring 3 will be formed is dug through etching before formation, the thickness of the torsion spring 3 can be more thinned. In this case, the length of the torsion spring 3 can be set to be shorter. Also, in all of the following embodiments, the light deflector can be structured with the same size as that in this embodiment.

Now, a method of manufacturing the light deflector 21 according to this embodiment will be described with reference to FIGS. 11A to 11J. FIGS. 11A to 11J are process diagrams showing the manufacturing method of the light deflector 21 according to this embodiment through dry etching.

Figure 11A:
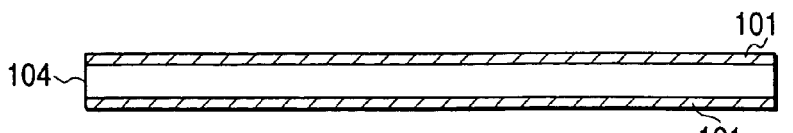
FIGS. 11A, 11B, 11C, 11D, 11E, 11F, 11G, 11H, 11I and 11J are diagrams for an explanation of a method of manufacturing the light deflector shown in FIG. 9.
Figure 11B:
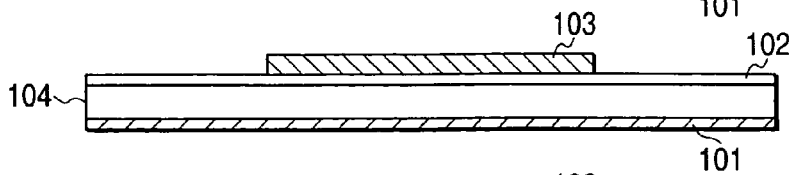

First, a mask layer 101 of silicon oxide is formed on both surfaces of a flat silicon substrate 104 through thermal oxidation as shown in FIG. 11A. Then, the silicon oxide on a side surface opposite to a surface used as the reflection surface 4 is removed through a wet etching method or the like. Also, as shown in FIG. 11B, an aluminum layer 102 that forms the reflection surface 4 is vapor-deposited on a silicon oxide removed surface, and thereafter a portion on which the reflection surface 4 is going to be formed is formed with a photoresist layer 103. Then, the aluminum layer 102 is patterned in such a manner that only the reflection surface remains through the wet etching using a solvent (for example, $H_3PO_4$, $HNO_3$, $CH_3COOH$ and $H_2O$ mixture solution, or the like) which erodes aluminum with the photoresist layer 103 functioning as a mask, and thereafter the resist layer 103 is removed.

Figure 1A:
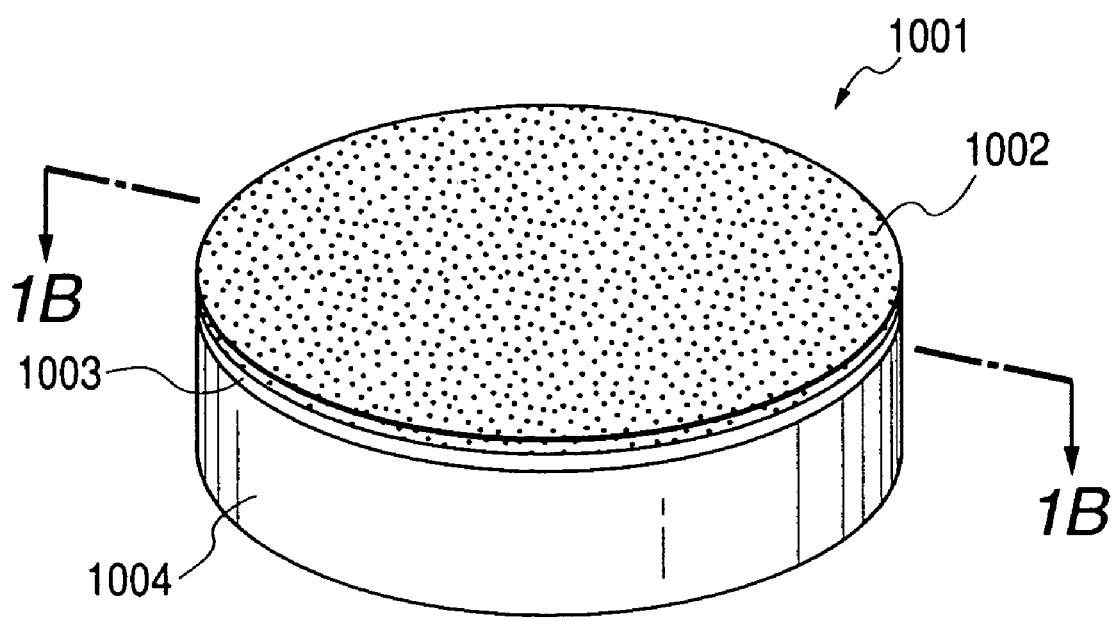
FIGS. 1A and 1B are diagrams showing a light deflector in the related art.
Figure 1B:
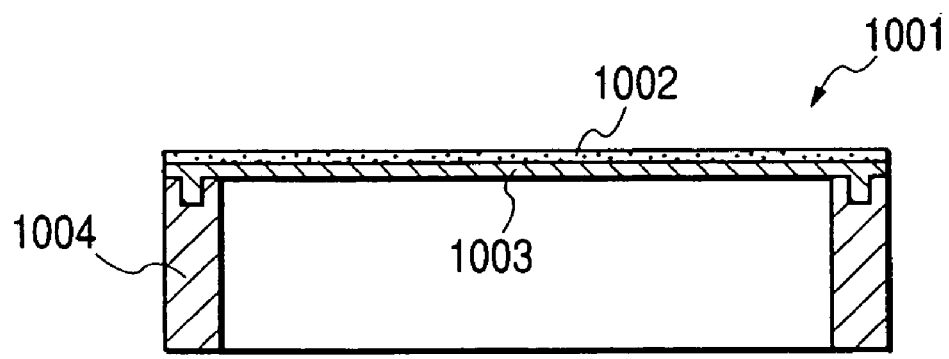
Figure 11C:
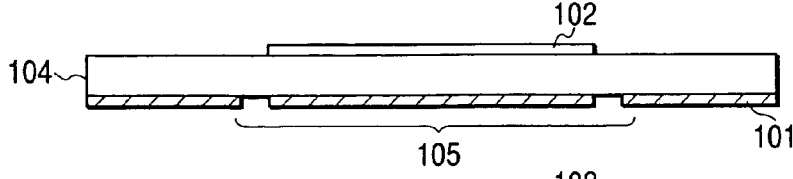
Figure 11D:
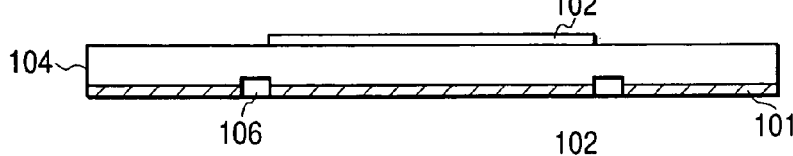

Subsequently, as shown in FIG. 11C, a photoresist layer (not shown) is formed on a surface on which the aluminum layer 102 is not vapor-deposited by using a mask corresponding to the outer configuration of the support substrate 2, the movable plate 6 and the torsion spring 3. Then, the silicon oxide layer 101 is patterned through a dry etching process using a gas (for example, $CF_4$ or the like) which erodes silicon oxide so that the portions of the support substrate 2, the torsion spring 3 and the movable plate 6 remain, to thereby form a first pattern 105. Thereafter, the photoresist layer is removed. Also, as shown in FIG. 1D, silicon is dry-etched by using an ICP-RIE (inductively coupled plasma-reactive ion etching) device to conduct a first etching 106. The amount of etching is as much as the thickness of the movable plate 6 that remains on the bottom of the final recessed portion 5C'.

Figure 11E:
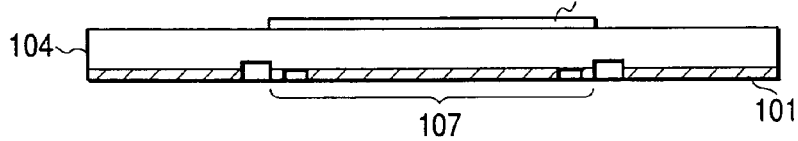
Figure 11F:
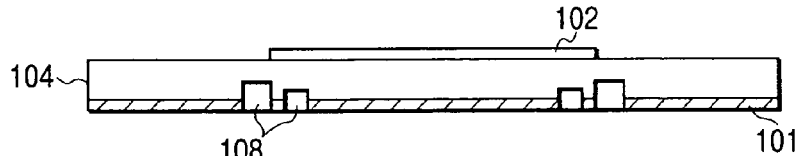
Figure 11G:
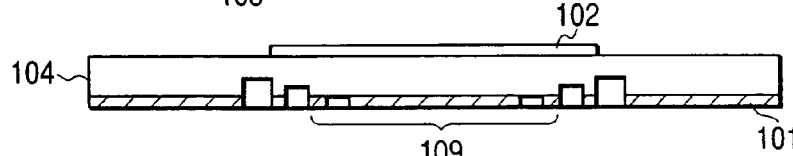

Then, as shown in FIG. 11E, a second pattern 107 is formed through a similar process to that of the first pattern 105 by using a mask corresponding to the configuration of a portion on which the recessed portion 5C' is going to be formed. Also, as shown in FIG. 11F, the dry etching process is conducted by using the ICP-RIE device to conduct a second etching 108. The amount of etching is as much as a dimensional difference of the depth between the final recessed portions 5C' and 5B'. In addition, as shown in FIG. 11G, a third pattern 109 is formed through a similar process to that of the first pattern 105 by using a mask corresponding to the configuration of a portion on which the recessed portion 5B' is going to be formed.

Figure 11H:
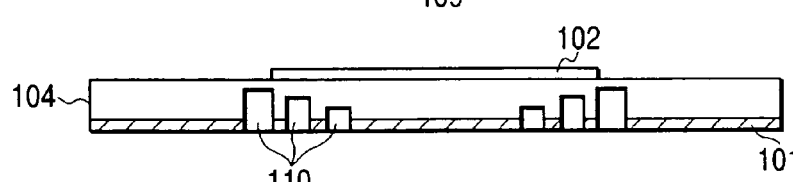
Figure 11I:
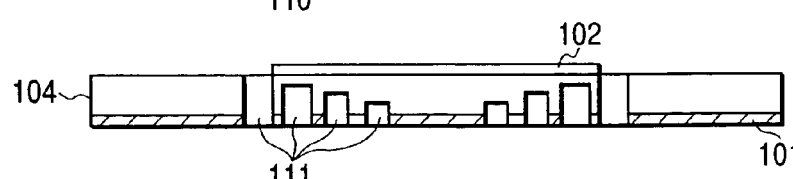

Subsequently, as shown in FIG. 11H, dry etching processing is performed by using ICP-RIE device to perform a third etching 110. The amount of etching is as much as a dimensional difference of the depth between the final recessed portions 5B' and 5A'. In addition, as shown in FIG. 11I, a fourth pattern (not shown) is formed by using a mask corresponding to the configuration of a portion on which the recessed portion 5A' is going to be formed. This pattern is used as an etching mask to perform a dry etching processing by using the ICP-RIE device. Thus, a fourth etching 111 is performed.

Figure 11J:
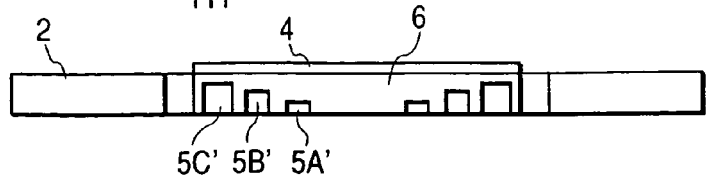

The recessed portion 5A' is formed through the fourth etching 111, and the torsion spring 3 and the movable plate 6 are released from the silicon substrate 104 so that the movable plate 6 and the torsion spring 3 are formed integrally. Finally, as shown in FIG. 11J, the silicon oxide layer 101 is removed, to thereby complete the light deflector in which the support substrate 2, the movable plate 6, the reflection surface 4, the torsion spring 3 and the recessed portions 5A', 5B' and 5C' are integrally formed.

In the light deflector 21 according to this embodiment, the movable plate 6 is elastically supported by the torsion spring 3 that is torsion-oscillatable, and the reflection surface 4 formed on the movable plate 6 is continuously torsion-oscillated by a driving means not shown, thereby being capable of deflecting and scanning the incident light, as in the first and second embodiment. Also, in this embodiment, single crystal silicon is etched by using the ICP-RIE device, to thereby process the single crystal silicon with precision so as to structure the light deflector.

The single crystal silicon not only has the material characteristics that are very suitable for the movable plate of the deflector because of the small density and the high rigidity, but also obtains an optically smooth surface by using the mirror ground surface of silicon substrate. Therefore, the inertia moment can be reduced without deteriorating the rigidity with a very simple process with respect to the movable plate having the reflection surface whose structural dimensions are in the order of from mm to µm. Also, the reflection surface can be formed on a smooth surface, and the optical performance of the reflection surface is not deteriorated.

Fourth Embodiment

Figure 12:
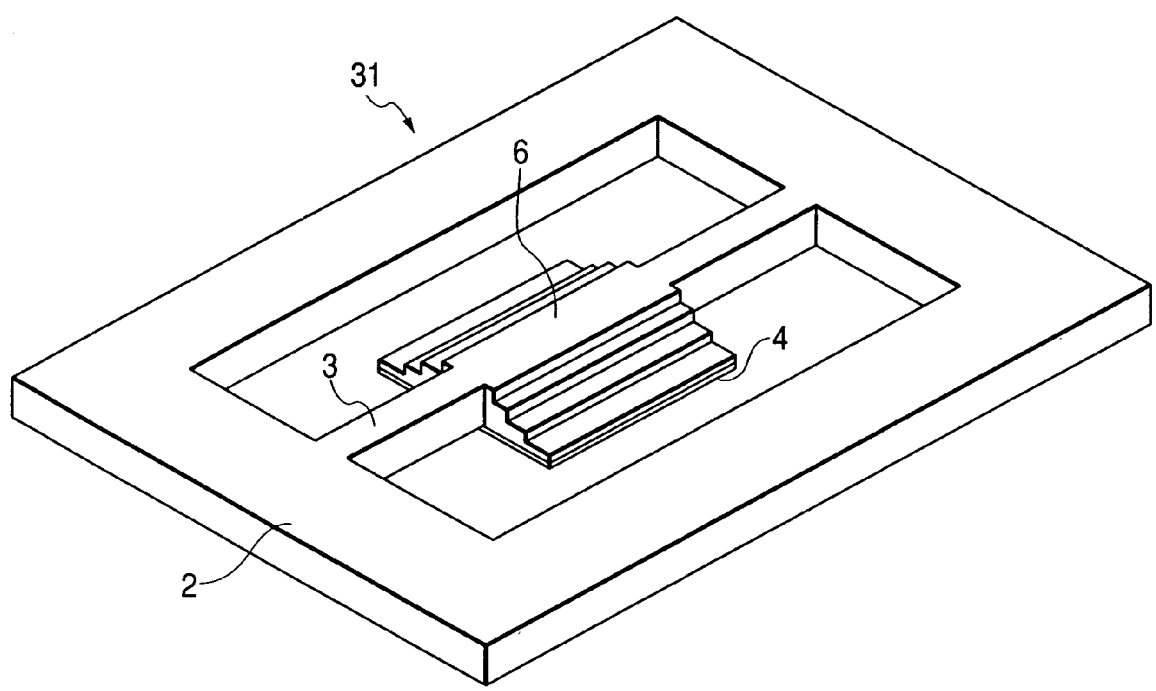
FIG. 12 is a perspective view showing a light deflector in accordance with a fourth embodiment of the present invention.

FIG. 12 is a perspective view showing a light deflector in accordance with a fourth embodiment of the present invention. The same parts as those in FIG. 9 are denoted by like reference. The light deflector 31 according to this embodiment is so formed as to provide a step structure such that the thickness is more thinned as it is away in a direction orthogonal to the torsion axis of the torsion spring 3 in the rear surface side of the movable plate 6. That the thickness of the movable plate 6 thus changes in a step configuration means that the movable plate 6 has the recessed portion in this embodiment. In this embodiment, the step configuration is formed over the entire region of the rear surface of the movable plate 6 except for a region on the extension of the torsion spring 3, that is, the entire region on both sides of the region on the extension of the torsion spring 3. It is needless to say that as least only one region of those regions on both sides may provide the step configuration. The support substrate 2, the movable plate 6, the reflection surface 4 and the torsion spring 3 are formed integrally with each other through the micro-machining technique applying the semiconductor manufacturing technique.

As described above, since the step structure is provided so that the thickness of the movable plate 6 becomes smaller toward the positions farther from the torsion axis of the torsion spring 3, the movable plate 6 is lightened more than that in the first to third embodiments, thereby being capable of further reducing the inertia moment at the time of torsion oscillation. Also, the step structure of the movable plate 6 contributes more to the inertia moment of the entire movable plate 6, and only a portion where the moment applied at the time of torsion oscillation is small can be removed preferentially. Therefore, the advantages that the inertia moment is reduced while keeping the high rigidity can be obtained.

There are many cases in which a wall surface of another substrate is close to the rear surface of the movable plate 6 when the light deflector is mounted. When a narrow gap is formed between the movable plate 6 and the wall surface at the time of the torsion oscillation of the movable plate 6, the damping effect due to the viscosity of the atmosphere becomes remarkable. This causes the Q value of oscillation in the case of conducting the resonance frequency driving to be greatly lowered, and the deflection angle of the light deflector to be remarkably made small.

Because the movable plate 6 of the light deflector 31 according to this embodiment can be structured in such a manner that a gap becomes larger toward the outer peripheral portion of the movable plate 6 due to the step structure formed on the rear surface, the damping effect can be suppressed. Therefore, even in the case of using the movable plate 6 whose area is large, the effect of suppressing the deterioration of the Q value is provided. In this embodiment, the spring 3 may be shaped in the X-shaped section as in the first embodiment, or only one of the surfaces between which the torsion spring 3 of the movable plate 6 is interposed may have the step configuration as described above.

Now, the method of manufacturing the light deflector 31 in accordance with this embodiment will be described with reference to FIGS. 13A to 13J. FIGS. 13A to 13J are process diagrams showing the manufacturing method through the dry etching of the light deflector 31 in this embodiment.

First, as shown in FIG. 13A, a mask layer 101 of silicon oxide is formed on both surfaces of a silicon substrate 104 through thermal oxidation. Then, the silicon oxide on a side surface opposite to a surface used as the reflection surface 4 is removed through a wet etching method or the like. Also, as shown in FIG. 12B, an aluminum layer 102 that forms the reflection surface 4 is vapor-deposited on a silicon oxide removed surface, and thereafter a portion on which the reflection surface 4 is going to be formed is formed with a photoresist layer 103. In addition, the aluminum layer 102 is patterned in such a manner that only the reflection surface remains through the wet etching using a solvent (for example, $H_3PO_4$, $HNO_3$, $CH_3COOH$ and $H_2O$ mixture solution, or the like) which erodes aluminum with the photoresist layer 103 functioning as a mask, and thereafter the resist layer 103 is removed.

Subsequently, as shown in FIG. 13C, a photoresist layer (not shown) is formed on a surface on which the aluminum layer 102 is not vapor-deposited by using a mask corresponding to the outer configuration of the support substrate 2, the movable plate 6 and the torsion spring 3. Then, the silicon oxide layer 101 is patterned through a dry etching process using a gas (for example, $CF_4$ or the like) which erodes silicon oxide so that the portions of the support substrate 2, the torsion spring 3 and the movable plate 6 remain, to thereby form a first pattern 105. Thereafter, the photoresist layer is removed. Then, as shown in FIG. 13D, silicon is dry-etched by using an ICP-RIE (inductively coupled plasma-reactive ion etching) device to conduct the first etching 106. The amount of etching is a minimum dimension value (i.e., thickness dimension value of the outermost portion) of the thickness of the final movable plate 6.

Then, as shown in FIG. 13E, a second pattern 107 is formed through a similar process to the first pattern 105 by using a mask corresponding to the configuration of the step structure of the movable plate 6. Also, as shown in FIG. 13F, the dry etching process is conducted by using the ICP-RIE device to conduct a second etching 108. The amount of etching is as much as a dimension of the one-step thickness corresponding to the step structure of the final movable plate 6. In addition, as shown in FIG. 13G, a third pattern 109 is formed through a similar process to that of the first pattern 105 by using a mask corresponding to the configuration of a third step of the step structure of the movable plate 6.

Subsequently, as shown in FIG. 13H, dry etching is performed by using the ICP-RIE device, thereby performing the third etching 110. The amount of etching is as much as a dimension of the one-step thickness corresponding to the step structure of the final movable plate 6. In addition, as shown in FIG. 13I, the fourth pattern (not shown) is formed by using a mask corresponding to the configuration of a fourth step of the step structure of the movable plate 6. This pattern is used as the etching mask to perform a dry etching processing by using the ICP-RIE device. Thus, the fourth etching 111 is performed.

Through the fourth etching 111, the torsion spring 3 and the movable plate 6 are released from the silicon substrate 104. Finally, as shown in FIG. 13J, the silicon oxide layer 101 is removed, to thereby complete the light deflector in which the support substrate 2, the movable plate 6, the reflection surface 4 and the torsion spring 3 are integrally formed.

Also, in the light deflector 31 according to this embodiment, the movable plate 6 is elastically supported by the torsion spring 3 that is torsion-oscillatable, and the reflection surface 4 formed on the movable plate 6 is continuously torsion-oscillated by a driving means not shown, thereby being capable of deflecting and scanning the incident light, likewise. Also, in the light deflector 31 according to this embodiment, single crystal silicon is etched by using the ICP-RIE device, to thereby process the single crystal silicon with precision so as to structure the light deflector.

The advantages of dry-etching the single crystal silicon to structure the light deflector 31 are similar to those of the light deflector 21 according to the above-mentioned third embodiment. In addition, since there can be provided a cubic structure in which the thickness is thinned along the outer peripheral direction of the movable plate 6 by etching with the structure in which the rear surface of the movable plate 6 is of the step structure, the inertia moment can be greatly reduced while keeping the high rigidity.

Fifth Embodiment

Figure 14:
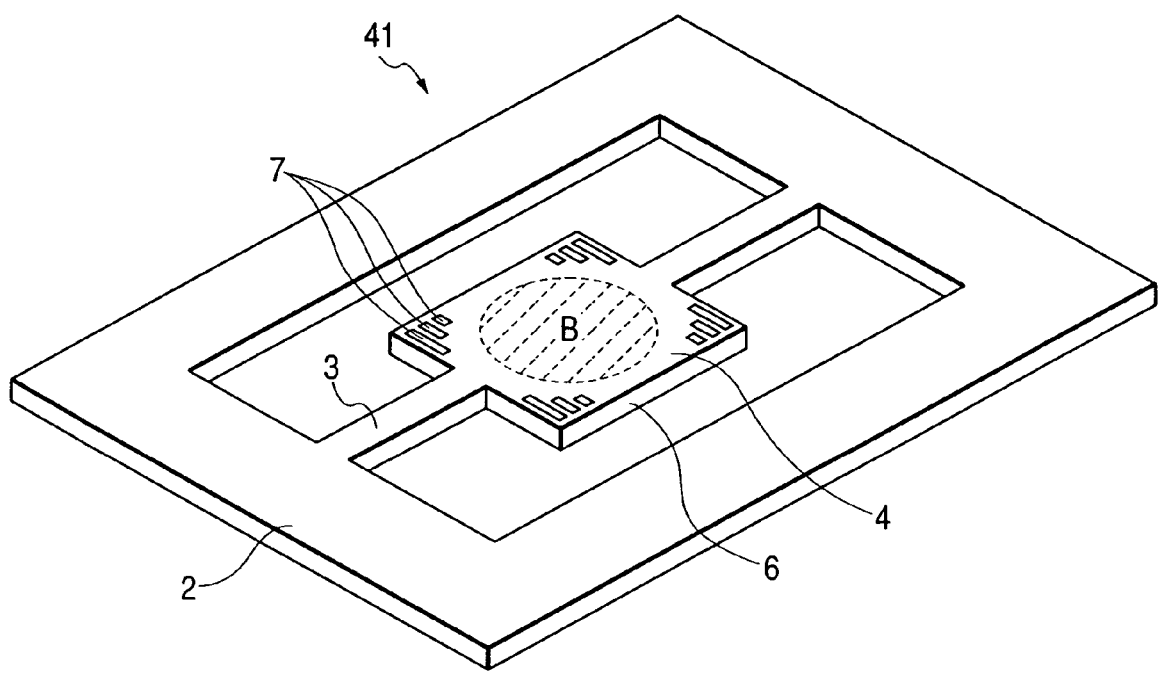
FIG. 14 is a diagram showing a light deflector in accordance with a fifth embodiment of the present invention.

FIG. 14 is a perspective view showing a light deflector in accordance with a fifth embodiment of the present invention. The light deflector 41 according to this embodiment is designed in such a manner that both ends of the movable plate 6 is elastically supported to the support substrate 2 that is a silicon substrate of crystal orientation (110) by the torsion spring 3 that is supported torsion-oscillatably, and the reflection surface 4 is formed on one surface of the movable plate 6. Also, through-holes 7 that are recessed portions are formed in the movable plate 6 and the reflection surface 4.

The support substrate 2, the movable plate 6, the reflection surface 4, the torsion spring 3 and the through-holes 7 are formed integrally with each other in such a manner that a silicon nitride film formed on the silicon substrate in advance is patterned by using a mask corresponding to the configuration of the movable plate 6, the torsion spring 3 and the through-holes 7 with respect to both surfaces of the silicon substrate, and anisotropic wet etching with such as potassium hydroxide aqueous solution is conducted to finally remove the silicon nitride.

Figure 13:
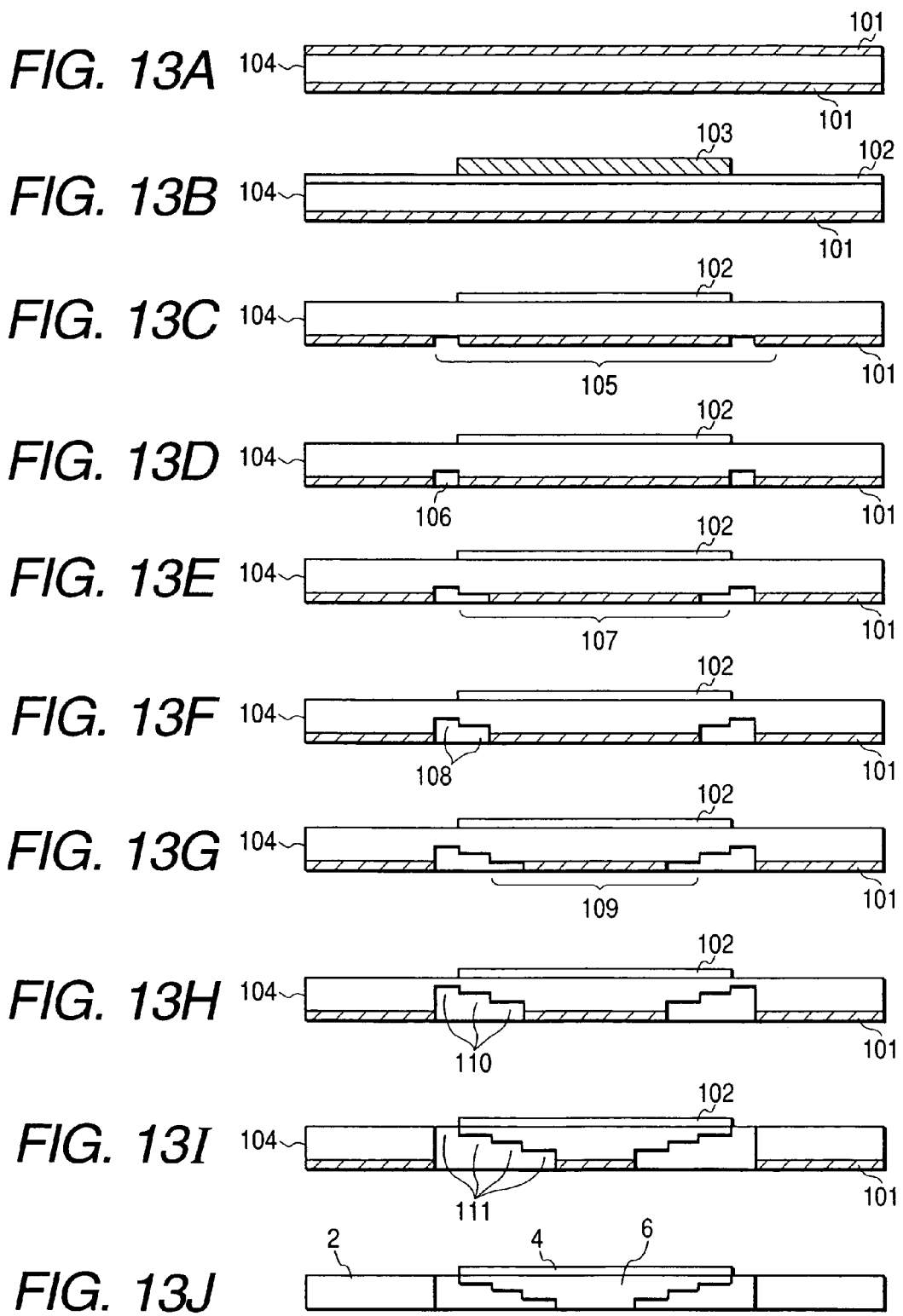
FIGS. 13A, 13B, 13C, 13D, 13E, 13F, 13G, 13H, 13I and 13J are diagrams for an explanation of a method of manufacturing the light deflector shown in FIG. 12.

The through-holes 7 are formed outside of the circular shape indicated by reference B, and the portion B indicates a beam spot on the reflection surface 4 when conducting the light deflection by the light deflector 41 with a laser whose maximum intensity is $1/e^2$. Since the light deflector 41 according to this embodiment conducts the anisotropic wet etching by using the silicon substrate of crystal orientation (110), the configuration of the movable plate 6 is limited to a polygonal configuration corresponding to the (111) plane of the single crystal silicon as shown in FIG. 13. For that reason, in the light deflector 41 formed so as to reflect the entire beam spot according to this embodiment, because a portion that does not contribute to the reflection exists outside of the portion B, the through-hole 7 is formed in that portion, thereby being capable of reducing the inertia moment of the movable plate 6 without deteriorating the optical characteristic of the light deflector.

Also, in this embodiment, the torsion spring 3 may be shaped in an X-shaped section, or a recessed portion may be formed on the side surface of the movable plate 6. Also, the through-hole 7 may be formed on only one of the surfaces of the movable plate 6 between which the torsion axis of the torsion spring 3 is interposed. Also, in this embodiment, a mode in which the extending direction of the torsion spring 3 is not in parallel with the outer side of the support substrate 2 is shown in FIG. 14. However, as in other embodiments, in this embodiment, the ends of two spatial portions that are surrounded by the movable plate 6, the support substrate 2 and the torsion spring 3 and also adjacent to each other through the torsion spring 3 in the longitudinal direction may be aligned.

Sixth Embodiment

Figure 15:
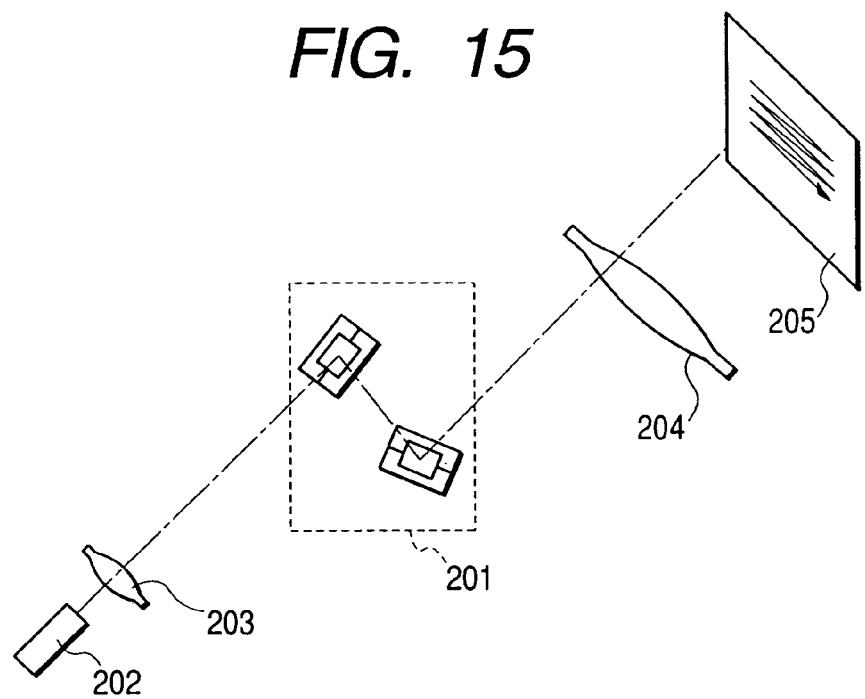
FIG. 15 is a diagram showing an optical device using the light deflector in accordance with one embodiment of the present invention.

FIG. 15 is a diagram showing an optical device using the above-mentioned light deflector in accordance with an embodiment. In this embodiment, an image display device is shown as the optical device. Referring to FIG. 15, reference numeral 201 denotes a light deflector group 21 in which two light deflectors are arranged in such a manner that the deflecting directions of the light deflectors according to the first to fifth embodiments are orthogonal to each other, which is used as an optical scanner device that raster-scans an incident light in the horizontal and vertical directions in this embodiment. Reference numeral 202 denotes a laser beam source. Reference numeral 203 is a lens or a lens group, 204 is a write lens or lens group, and 205 is a projection surface. The laser beam incident from the laser beam source 202 is subjected to a given intensity modulation related to the light scanning timing and two-dimensionally scanned by the light deflector group 201. The scanned laser beam allows an image to be formed on the projection surface 205 through the write lens 204. In this way, the optical device according to this embodiment can be used as a light write means into a laser scanning type image display apparatus for displaying an image to a projection surface, i.e., a laser scanning type projector.

Seventh Embodiment

Figure 16:
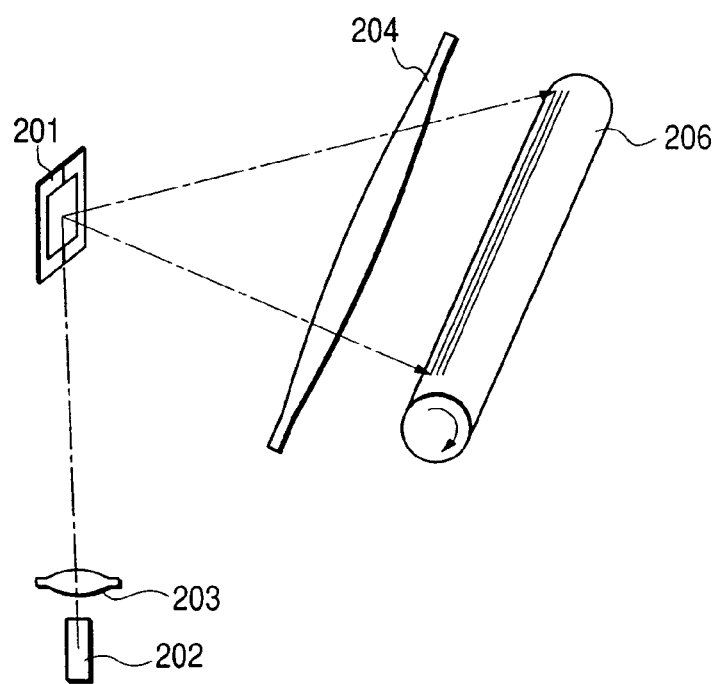
FIG. 16 is a diagram showing an optical device using the light deflector in accordance with another embodiment of the present invention.

FIG. 16 is a diagram showing an optical device using the above-mentioned light deflector in accordance with another embodiment. In this embodiment, an image display device is shown as the optical device. Referring to FIG. 16, reference numeral 201 denotes a light deflector in accordance with the first to fifth embodiments, and is used as an optical scanner device that scans one-dimensionally an incident light. Reference numeral 202 denotes a laser beam source. Reference numeral 203 is a lens or a lens group, 204 is a write lens or lens group, and 206 is a photosensitive member. The laser beam emitted from the laser beam source 202 is subjected to a given intensity modulation related to the light scanning timing and one-dimensionally scanned by the light deflector 201. The scanned laser beam allows an image to be formed on the photosensitive member 206 through the write lens 204.

The photosensitive member 206 is uniformly charged by a charger not shown, and a laser beam scans the photosensitive member 206 to form an electrostatic latent image on the portion of the photosensitive member. Then, a toner image is formed on an image portion of the electrostatic latent image by a developing unit not shown, and the toner image is transferred and fixed onto, for example, a sheet not shown, to thereby form an image on the sheet.

In the above-mentioned respective embodiments, the light deflector or the diffraction grating is exemplified as one example, but the torsion oscillating member according to the present invention may be employed as an angular velocity sensor or the like besides the light deflector. Then, since the torsion oscillating member according to the present invention is formed with the recessed portion at a location apart from the shaft on one surface of the movable plate, the inertia moment of the movable plate can be reduced while ensuring the high rigidity, and the spring rigidity of the shaft can be set to be smaller while being the fine torsion oscillating member having the dimensional order of from μm to mm, thereby being capable of reducing the dynamic deflection at the time of torsion vibration.

Also, as described above, according to the present invention, since the recessed portion is formed on a surface of the movable plate opposite to the reflection surface, thereby being capable of reducing the inertia moment of the movable plate while ensuring the high rigidity, and in the fine light deflector having the dimensional order of from μm to mm, the spring rigidity of the elastic support portion can be set to be smaller, thereby being capable of reducing the dynamic deflection at the time of torsion vibration. For that reason, there can be realized the downsized light deflector that can be driven at a high speed, can be driven at a large deflection angle even by an actuator of a low generating force, and is small in distortion even at the high speed operation.

Also, since the light deflector is integrally manufactured by using single crystal silicon, single crystal silicon not only provides a material characteristic low in the density and high in the rigidity, but also enables the fine processing through the etching process, thereby obtaining an optical smooth surface if the mirror ground surface of the silicon substrate is employed. Therefore, the support substrate, the elastic support portion and the movable plate are formed from the silicon substrate of single crystal by using the etching technique, and a recessed portion is formed on one surface of the movable plate whereas a reflection surface is formed on the other surface thereof, thereby being capable of manufacturing the light deflector through a very simple process and also forming the reflection surface on the smooth surface.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A light deflector in which both ends of a movable plate are supported to a support substrate by an elastic support portion, a reflection surface is formed on one surface of the movable plate, and the movable plate is torsion-oscillated about a torsion axis of the elastic support portion as a center to deflect an incident light that enters the reflection surface,
   wherein a plurality of recessed portions are formed outwardly from a center of the torsion axis of the elastic support portion on at least one surface of both sides, which is a surface of the movable plate opposite to the reflection surface, and between which the torsion axis of the elastic support portion is interposed, and
   wherein the plurality of recessed portions are formed so as to gradually outwardly increase at least one of its diameter and its depth.

2. A method of manufacturing a light deflector, comprising the steps of:
   forming a mask layer on one surface of a silicon substrate;
   forming a reflection film on a portion of another surface of the silicon substrate on which a reflection surface is formed;
   removing the mask layer formed on the silicon substrate, with portions of the mask layer where a support substrate, an elastic support portion and a movable plate are to be formed left unremoved, and dry-etching regions of the silicon substrate, with parts where the support substrate, the elastic support portion and the movable portion are to be formed left unetched, to a given depth;
   repeatedly removing a recessed portion of the mask layer formed on the silicon substrate and the etching of the given depth due to the dry etching of the silicon substrate in accordance with a number of recessed portions formed on the movable plate in a direction crossing a torsion axis of the elastic support portion, to thereby separate the silicon substrate into the support substrate, the, elastic support portion and the movable plate, and to form on the movable plate a plurality of recessed portions that gradually outwardly increase its diameter and its depth from the torsion axis; and
   removing the mask layer from the silicon substrate.

3. The light deflector according to claim 1, wherein the elastic support portion has an X-shaped cross-section.

4. The light deflector according to claim 1, wherein the support substrate, the elastic support portion, the movable plate and the recessed portions are integrally formed with each other by single crystal silicon.

* * * * *